June 17, 1969  R. L. FRANKS, JR., ET AL  3,449,860
APPARATUS FOR CLOSING OPENINGS Filed June 1, 1967  Sheet 1 of 2

INVENTORS
ROBERT L. FRANKS JR.
FRANK C. FONTENOT

BY Shanley & O'Neil
ATTORNEYS

INVENTORS
ROBERT L. FRANKS JR.
FRANK C. FONTENOT

BY Shanley & O'Neil

ATTORNEYS

United States Patent Office 3,449,860
Patented June 17, 1969

3,449,860
APPARATUS FOR CLOSING OPENINGS
Robert L. Franks, Jr., 1601 Woodland Drive, Lake Charles, La. 70601, and Frank C. Fontenot, Box 393, Ville Platte, La. 70586
Filed June 1, 1967, Ser. No. 642,962
Int. Cl. E06b 7/18; E05c 9/12, 1/14
U.S. Cl. 49—317         7 Claims

ABSTRACT OF THE DISCLOSURE

Rapidly operable apparatus for closing escape hatches or other openings includes a cover and an elongated support member extending in a direction generally normal to the cover. A plurality of locking members extending radially relative to the support member are moved radially to lock and unlock the cover. The locking members are moved through a system of inclined planes by an actuator which is associated with the support member and moved toward and away from the locking members by a motive device such as a hand wheel or fluid motor.

Background of the invention

This invention pertains to rapidly removable, rapidly replaceable apparatus for closing openings. In its more particular aspects, the invention relates to quickly operable closures for escape hatches and other access openings in spacecraft, aircraft and marine craft.

In space, air and marine craft, as well as other sealed environments, the covers of escape hatches and other access openings must be capable of rapid operation. Tragedies involving fatalities to occupants of sealed enclosures have occurred because hatch covers could not be operated with sufficient speed.

Accordingly, a main object of the invention is the provision of improved, quickly removable, quickly replaceable closure apparatus.

Another object of the invention is the provision of improved, rapidly operable closure apparatus characterized by a relatively simple construction which assures rapid and effective opening.

Still another object of the invention is the provision of improved, rapidly operable closure apparatus adapted for use as covers for sealed access openings in spacecraft, airplanes, and marine vessels.

Other objects of the invention, its features and advantages, will appear from the following detailed description which, when considered in conjunction with the accompanying drawings, discloses several embodiments of the invention for purposes of illustration only. For definition of the scope of the invention, reference will be made to the appended claims.

Brief description of the drawings

In the drawings, wherein similar reference characters denote similar elements throughout the several schematic views.

Description of the illustrated embodiments

Figure 1:
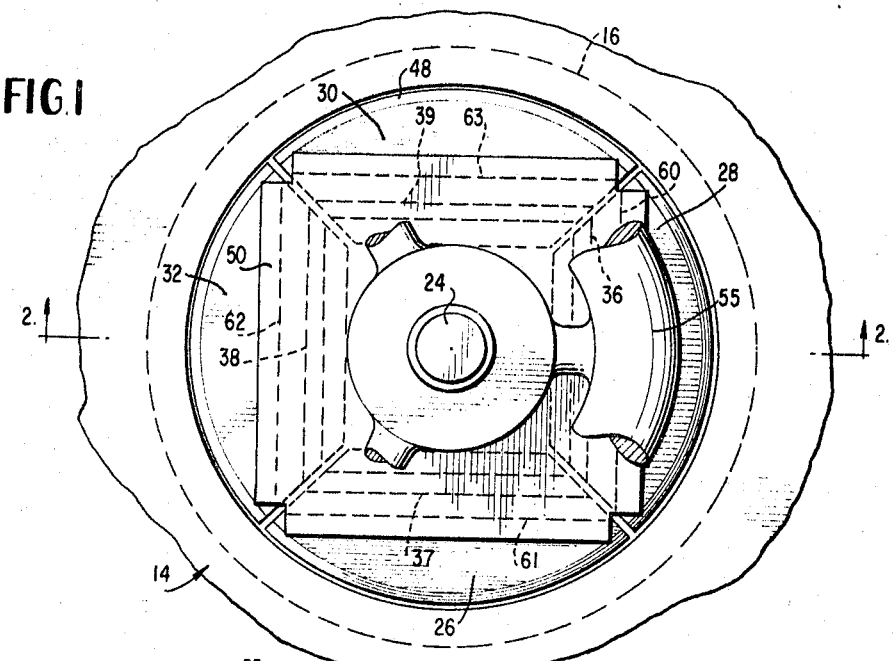
FIGURE 1 is a plan view of apparatus forming one embodiment of the invention.
Figure 2:
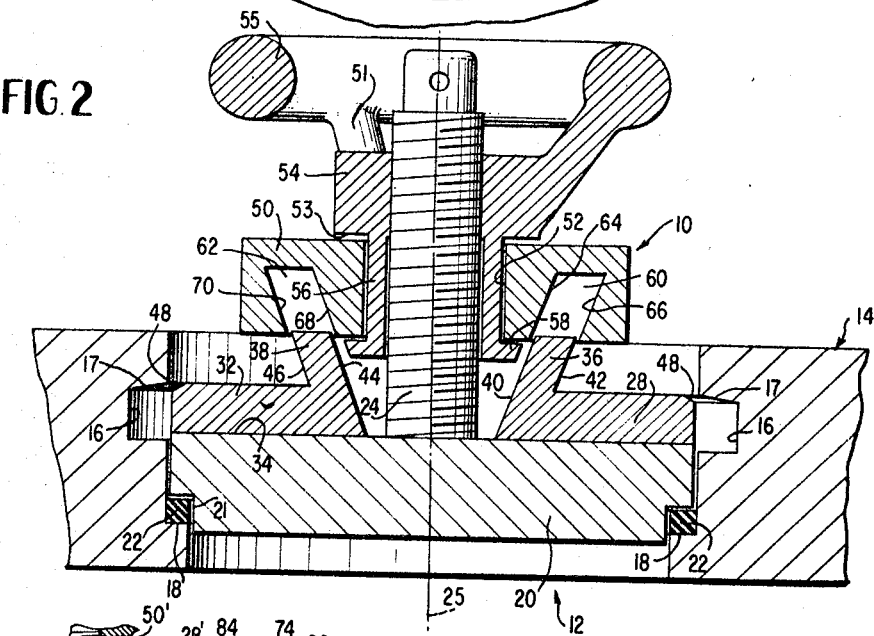
FIGURE 2 is a cross-sectional view taken on line 2—2 of FIGURE 1.

In FIGURES 1 and 2, closure apparatus 10 is disposed in an annular access opening 12 formed in a barrier structure 14 which for example, may be a bulkhead in a space, air or marine craft. A slot 16 is formed in barrier 14 around the periphery of opening 12 and includes an inclined wall 17. An annular shoulder 18 on barrier 14 circumscribes the opening to provide a seat for cover member 20. Sealing ring 22 on shoulder 18 provides a fluidtight seal when closing apparatus 10 is locked in position closing opening 12.

Cover 20 conforms generally to the configuration of opening 12, and includes an annular recess 21 conforming to shoulder 18 for seating on the shoulder. An externally threaded, elongated support member 24 having its longitudinal axis 25 extending in a direction generally normal to cover 20, is fixedly secured to the cover. Four generally wedge-shaped locking members 26, 28, 30, 32 extend radially relative to support member 24 and are mounted in slideable engagement with planar surface 34 of cover 20 for radial movement relative to support member 24.

Locking members 28, 32 include projecting members 36, 38 respectively. Locking members 26, 30 include similar projecting members 37, 39. The projecting members extend in a direction away from cover 20, and each projecting member includes radially inner and radially outer planar surfaces which are inclined, for example at an angle of about 20°, with respect to the longitudinal axis 25 of support member 24. Thus, projecting member 36 includes radially inner and radially outer surfaces 40, 42 respectively, and projecting member 38 includes radially inner surface 44 and radially outer surface 46. Surfaces 40, 42 on projecting member 36 are generally parallel to one another, as is the case with similar surfaces on the other projecting members.

The radially inner peripheral edges of the four locking members in assembly define a generally square outline as shown in FIGURE 1. The outer peripheral edge portions of the locking members collectively define an outline conforming to opening 12, and are shaped to be received in slot 16 in barrier 14 upon radially outward movement of the locking members. Each locking member has a beveled edge surface 48.

An actuating member 50 is mounted for movement in a direction toward and in a direction away from the locking members. An aperture 52 is formed in actuator 50, and support member 24 projects through the aperture to a free end portion. A bushing 54 threadedly engages support member 24 and is fixedly secured by spokes 51 to a rotatable hand wheel 55. Bushing 54 has a shoulder 53 extending laterally beyond the periphery of opening 52. Bushing 54 also includes a tubular portion 56 extending through opening 52 and having lugs 58 which project laterally beyond the periphery of opening 52. Rotation of hand wheel 55 moves actuator 50 axially relative to support member 24 toward and away from the locking members, since the construction of bushing 54 permits rotation of the bushing in the actuator while shoulder 53 and lugs 58 carry the actuator axially with the bushing in a direction generally normal to the cover 20.

Actuator 50 includes recesses opening in a direction toward the locking members and conforming generally to the configuration of the projecting members to receive the projecting members. Thus, recesses 60, 62 are disposed to receive projecting members 36, 38 respectively, and similar recesses 61, 63 are disposed to receive projecting members 37, 39 respectively. The recesses include radially inner inclined, planar surfaces opposing the radially inner surfaces of the projecting members, and also include radially outer, inclined planar surfaces opposing the radially outer inclined surfaces of the projecting members. Thus, recess 60 includes radially inner inclined surface 64 opposing surface 40 of projecting member 36. Recess 60 also includes radially outer inclined surface 66 opposing surface 42 of projecting member 36. Recess 62 includes radially inner inclined surface 68 opposing surface 44 of projecting member 38, and radially outer surface 70 opposite surface 46 of that projecting member. Surfaces (not shown) of recesses 61, 63 which are identical to surfaces 64, 68 of recesses 60, 62 oppose surfaces on projecting members 37, 39 which are identical to surfaces 40, 44 on projecting members 36, 38. Also, surfaces (not shown) of recesses 61, 63 which are identical to surfaces 66, 70 of recesses 60, 62 oppose surfaces on projecting members 37, 39 which are identical to surfaces 42, 46 of projecting members 36, 38. Surfaces 64, 66 are generally parallel to one another and to surfaces 40, 42. This relationship exists between like surfaces of other recesses and corresponding surfaces on the other projecting members.

The radially inner inclined surfaces of the actuator 50 engage the radially inner inclined surfaces of the projecting members and, through wedging action, move the locking members radially outwardly when the actuator 50 is moved axially along elongated member 24 toward the locking members and cover 20 by rotation of hand wheel 55 in one angular direction. The radially outer peripheral edge portions of the locking members are thereby moved into slot 16 to lock the cover 20 in position closing opening 12. As the outer peripheral edge portions of the locking members enter slot 16, beveled surfaces 48 are wedged towards shoulder 18 by inclined surface 17 in slot 16, to seat cover 20 on the shoulder and compress ring 22 to form a fluidtight seal.

The radially outer inclined surfaces of the actuator 50 engage the radially outer inclined surfaces of the projecting members and move the locking members radially inwardly when the actuator is moved away from the locking members by rotation of hand wheel 55 in the angular direction opposite from that in which it was rotated to lock the closure. The outer edges of the locking members are thus forcibly withdrawn from slot 16 by the action of the outer inclined surfaces on actuator 50 to unlock the cover 20 so that it may be removed to uncover opening 12.

Figure 3:
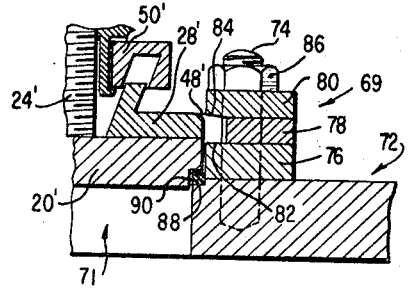
FIGURE 3 is a cross-sectional view of another embodiment of the invention.

FIGURE 3 depicts another embodiment of the invention, in which an adapter 69 has been fitted around an annular opening 71 formed in a barrier 72. The barrier carries a multiplicity of bolts 74 which had been used to bolt down a cover plate. Loosening and retightening of bolts 74 is a time-consuming task, and adapter 69 permits use of rapidly operable closing apparatus 10', which is identical to the closing apparatus of FIGURES 1–2.

Adapter 69 includes a first annular spacer ring 76, a second annular spacer ring 78, and a locking ring 80. Ring 78 is narrower than rings 76, 80, to form an annular slot 82, and ring 80 includes a tapered portion 84 to form an inclined wall of the slot. The rings are permanently secured on bolts 74 by nuts 86. Movement of actuator 50' axially along support member 24' moves locking members such as 28' radially into and out of slot 82 in the fashion discussed hereinabove. Inclined wall 84 coacts with beveled surface 48' on the locking members to seat cover 20' on shoulder 88, compressing sealing ring 90 to form a fluidtight seal.

Figure 4:
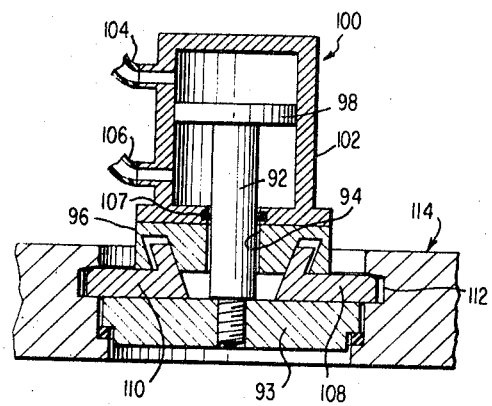
FIGURE 4 is a cross-sectional view of still another embodiment of the invention.

Still another embodiment of the invention is shown in FIGURE 4. Support member 92 is fixedly secured to cover 93 and slideably received in an aperture 94 in actuator 96. Support member 92 projects through the aperture to a free end portion to which a piston 98 of a fluid motor 100 is fixedly secured. Motor 100 includes a cylinder 102 which is fixedly secured to actuator 96. Fluid connections 104, 106 are provided for supply and discharge of fluid to opposite sides of piston 98. The fluid may be hydraulic liquid or a gaseous material such as compressed air. Sealing ring 107 prevents escape of fluid from cylinder 102.

Supply of fluid under pressure through connection 104 and bleeding of fluid from connection 106 moves cylinder 102, and thus actuator 96, axially relative to support member 92 away from locking members 108, 110. The locking members are extracted from slot 112 in barrier 114 by action of inclined planes on actuator 96 in the fashion discussed hereinbefore. Supply of pressurized fluid through connection 106 and discharge from connection 104 moves cylinder 102 and actuator 96 toward the locking members to move the locking members radially outwardly to lock cover 93 in closing position.

Figure 5:
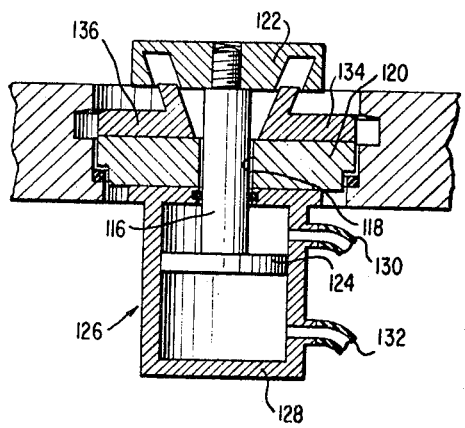
FIGURE 5 is a view in cross-section of yet another embodiment of the invention.

In the embodiment of FIGURE 5, support member 116 is slideably received in aperture 118 in cover 120. Support member 116 is fixedly secured to actuator 122 and projects through aperture 118 to a free end portion. The piston 124 of a fluid motor 126 is fixedly secured to the free end portion of support member 116, and the cylinder 128 of motor 126 is fixedly secured to cover 120. Supply of pressurized fluid through connection 130 and bleeding of fluid from connection 132 forces piston 124 downwardly as shown in the drawing and actuator 122 moves toward locking members 134, 136 to move the locking members radially outwardly to lock cover 120 in the fashion described hereinabove. Supply of pressurized fluid through connection 132 and bleeding from connection 130 move piston 124 upwardly and actuator 122 is moved away from locking members 134, 136 to move the locking members radially inwardly to unlock the closure.

Figure 6:
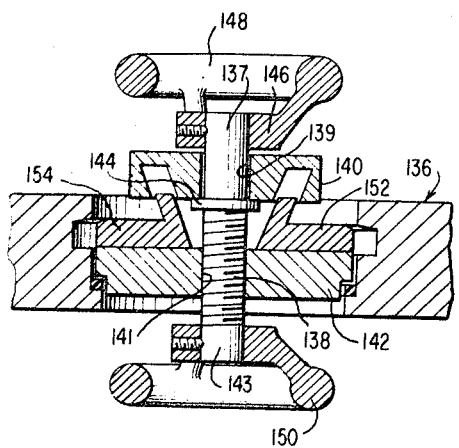
FIGURE 6 is a cross-sectional view of another embodiment of the invention.

The embodiment illustrated in FIGURE 6 is operable from both sides of barrier 136. Support member 138 is rotatably received in aperture 139 in actuator 140, and projects through the aperture to a free end portion 137 to which a hand wheel 148 is fixedly secured. Support member 138 is rotatably threadedly received in aperture 141 in cover 142, and projects to another free end portion 143 to which another hand wheel 150 is fixedly secured. Actuator 140 is secured against axial movement relative to support member 138, although support member 138 is free to rotate in aperture 139 in actuator 140. This is effected by a flange 144 on support member 138 and hub 146 of hand wheel 148. Hub 146 and flange 144 extend beyond the periphery of aperture 139 to carry actuator 140 between them.

Rotation of either of the hand wheels 148, 150 rotates support member 138, and by virtue of the threaded engagement of support member 138 with cover 142, the support member 138 moves in a direction generally normal to the cover and carries actuator 140 toward and away from locking members 152, 154 to lock and unlock the closure 142 in the manner discussed hereinabove.

Figure 7:
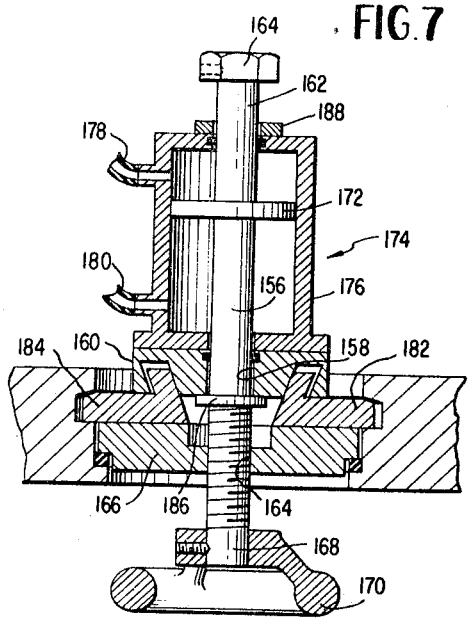
FIGURE 7 is a view in vertical cross-section of still another embodiment of the invention.

In FIGURE 7, an embodiment of the invention is shown in which support member 156 is rotatably received in aperture 158 in actuator 160. Support member 156 projects through aperture 158 to a free end portion 162, to which a nut 164 is fixedly secured. Support member 156 is rotatably, threadedly received in aperture 164 in cover member 166, and projects through aperture 164 to a free end portion 168 to which a hand wheel 170 is fixedly secured.

Piston 172 of fluid motor 174 is fixedly secured to support member 156 at a location between actuator 160 and free end portion 162 of support member 156. Cylinder 176 of fluid motor 174 is fixedly secured to actuator 160. With the parts in the position illustrated, supply of pressurized fluid through connection 178 and bleeding through connection 180 moves cylinder 176, and consequently moves actuator 160, axially relative to support member 156 and away from locking members 182, 184 to move the locking members radially inwardly. Support member 156 remains stationary by virtue of its threaded engagement with cover 166. Supply of fluid through connection 180 and bleeding through connection 178 moves cylinder 176 and actuator 160 toward the locking members to move the locking members radially outwardly.

Should the fluid motor or its control system malfunction, the closure can still be operated quickly by rotation of either hand wheel 170 or nut 164. Rotation of wheel 170 or nut 164 rotates support member 156 and the support member moves in a direction normal to cover 166 by virtue of the threaded engagement of support member 156 in cover 166. Rotation of the wheel or nut in one direction moves actuator 160 in a direction away from the locking members, because flange 186 on support member 156, extending beyond the periphery of aperture 158 in actuator 160, carries the actuator in that direction. Rotation of support member 156 to move it in the opposite direction moves actuator 160 toward the locking members, because nut 164 bears against spacer ring 188, which transmits the bearing force through cylinder 176 to the actuator.

Apparatus constructed in accordance with the principles of the invention are highly advantageous. Such apparatus are rapidly removable and replaceable, requiring operation of only a single motive device such as a hand wheel. The apparatus are of relatively simple construction, yet through a unique arrangement of inclined planes achieve high effectiveness and reliability. The apparatus include features which provide positive unlocking action, in exerting a powerful radially inwardly directed force on the locking members to extract the locking members from the slot. This is a very important advantage, since many closures must withstand high pressures which tend to jam radially movable locking pins or other members in their recesses in the structure which surrounds the openings. Relatively large radially inwardly directed forces may be required to extract the locking members under such circumstances, and the invention provides apparatus which effectively applies such forces.

Other advantages of the invention include the provision of a continuous fluidtight seal around the periphery of the cover, the outer peripheral edge portions of the locking members applying a uniform closing pressure to the cover around its periphery, so that even in the event of warpage of the cover, no portion can pull away from sealed engagement with the sealing ring. Also, inventive apparatus can be constructed to operate from either or both sides of a barrier, using either simple mechanical or powered motive devices or a combination thereof. Further, the apparatus is highly flexible in that it can be used in a wide variety of environments wherever quickly removable, quickly replaceable closures are either essential or desirable. For example, pressure vessels or other chambers, heat exchangers, pumps, and other types of industrial equipment are usually provided with openings for access for repair and maintenance or other purpose. Apparatus according to the invention can be advantageously used in such applications.

Although the present inveniton has been described in connection with several embodiments, modifications of the embodiments illustrated can be made without departing from the invention.

We claim:
1. Apparatus for closing an opening having a periphery, comprising
    a cover member generally conforming to the opening, support member associated with the cover member and extending transversely to the cover member,
    a plurality of radically extending, generally wedge-shaped locking members having radically outer peripheral edge portions collectively defining an outline generally conforming to the periphery of the opening,
    the locking members being operatively associated with the cover member and being mounted for radial movement relative to an axis extending in a direction generally normal to the cover member,
    means defining a slot at the periphery of the opening for receiving the outer peripheral edge portion of each locking member,
    the outer peripheral edge portion of each locking member being movable into and out of the slot upon movement of the locking member away from and toward the axis,
    each locking member including a projecting member having surfaces and extending in a direction away from the cover member,
    the surfaces of each projecting member including radially inner and radially outer surfaces inclined relative to the axis,
    an actuating member operatively associated with the support member for movement toward and away from the cover members,
    means including surfaces defining a plurality of recesses in the actuating member,
    each recess generally conforming to a projecting member and receiving a projecting member,
    the surfaces of each recess including radially inner and outer surfaces inclined relative to the axis,
    the radially inner inclined surface of each recess opposing and being generally parallel to a radially inner inclined surface on a projecting member,
    the radially outer inclined surface of each recess opposing and being generally parallel to a radially outer inclined surface on a projecting member,
    the surfaces of the recesses and the surfaces of the projecting members being shaped to secure the actuating member against rotation relative to the axis, and
    motive means operatively associated with the support member for moving the actuating member toward and away from the cover members to engage the inclined surfaces of the recesses with the inclined surfaces of the projecting members and move the locking members radially relative to the axis.

2. The apparatus of claim 1,
    the radially inner and outer inclined surfaces of the projecting members being planar surfaces, and
    the radially inner and outer inclined surfaces of the recesses being planar surfaces.

3. The apparatus of claim 1,
    the actuating member including means defining an aperture for receiving the support member,
    the support member being fixedly secured to the cover member and projecting through the aperture to a free end portion,
    the motive means including rotatable means threadedly engaging the free end portion of the support member and being rotatably secured to the actuating member, for moving the actuating member toward and away from the cover member.

4. The apparatus of claim 1,
    the actuating member including means defining an aperture for sildably receiving the support member,
    the support member being fixedly secured to the cover member and projecting through the aperture to a free end portion,
    the motive means including fluid motor means for moving the actuating member toward and away from the cover member,
    the fluid motor means including a piston fixedly secured to the free end portion of the support member and a cylinder fixedly secured to the actuating member.

5. The apparatus of claim 1,
    the cover member including means defining an aperture for rotatably receiving the support member,
    the support member being fixedly secured to the actuating member and projecting through the aperture to a free end portion,
    the motive means including fluid motor means for moving the actuating member toward and away from the cover member, the fluid motor means including a piston fixedly secured to the free end portion of the support member and a cylinder fixedly secured to the cover member.

6. The apparatus of claim 1, the actuating member including means defining an aperture for rotatably receiving the support member, means for securing the actuating member for movement with the support member in the direction of the axis, the cover member including means defining an aperture for rotatably receiving the support member, the support member projecting through the aperture in the actuating member to a first free end portion and projecting through the aperture in the cover member to a second free end portion, the support member being threadedly received in the aperture in the cover member, the motive means including first rotatable means fixedly secured to the first free end portion of the support member, and second rotatable means fixedly secured to the second free end portion of the support member, the first and second rotatable means each being operative to move the actuating member toward and away from the cover member.

7. The apparatus of claim 1, the actuating member including means defining an aperture for rotatably receiving the support member, means for securing the actuating member for movement with the support member in the direction of the axis, the cover member including means defining an aperture for rotatably receiving the support member, the support member projecting through the aperture in the actuating member to a first free end portion and projecting through the aperture in the cover member to a second free end portion, the support member being threadedly received in the aperture in the cover member, the motive means including fluid motor means having a piston fixedly secured to the support member between the actuating member and the first free end portion of the support member and a cylinder fixedly secured to the actuating member, first rotatable means fixedy secured to the first free end portion of the support member, and second rotatable means fixedly secured to the second free end portion of the support member, the fluid motor means and the first and second rotatable means each being operative to move the actuating member toward and away from the cover member.

References Cited

UNITED STATES PATENTS

| | | | |
|---|---|---|---|
| 320,971 | 6/1885 | Rowland | 220—55.3 |
| 847,265 | 3/1907 | Super | 292—37 XR |

FOREIGN PATENTS 791,086  2/1958  Great Britain.

KENNETH DOWNEY, *Primary Examiner.*

U.S. Cl. X.R.

49—465; 220—55; 292—37, 43

UNITED STATES PATENT OFFICE

CERTIFICATE OF CORRECTION

Patent No. 3,449,860      Dated June 17, 1969

R. L. Franks, Jr.
  et al

It is certified that errors appear in the above-identified patent and that said Letters Patent are hereby corrected as shown below:

Col. 5, line 65, before "support" should be -- a --.
  Col. 5, line 67, "radically" should be -- radially --.
  Col. 5, line 68, "radically" should be -- radially --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents